United States Patent [19]
Johnson et al.

[11] 3,905,634
[45] Sept. 16, 1975

[54] QUICK RELEASE LATCH FOR REACTOR SCRAM

[75] Inventors: Melvin L. Johnson, Wichita, Kans.; Bruce M. Shawver, San Jose, Calif.

[73] Assignee: The United States of America as represented by the United States Energy Research and Development Administration, Washington, D.C.

[22] Filed: June 4, 1974

[21] Appl. No.: 476,184

[52] U.S. Cl. ........... 294/86 A; 176/36 R; 294/86.14; 294/86.3; 294/86.33
[51] Int. Cl.² ......................................... G21C 7/08
[58] Field of Search ............ 294/86.1, 86.14, 86.15, 294/86.17, 86.26, 86.28, 86.29, 86.3, 86.32, 86.33, 88, 90, 115; 176/12, 15, 16, 22, 30, 36 R, 36 C

[56] References Cited
UNITED STATES PATENTS

| | | | |
|---|---|---|---|
| 2,128,102 | 8/1938 | Sherman | 294/86.3 X |
| 2,507,127 | 5/1950 | True | 294/86.33 X |
| 2,794,670 | 6/1957 | Menegus et al. | 294/86.14 |
| 3,079,323 | 2/1963 | Hawke | 176/36 R X |
| 3,604,746 | 9/1971 | Notari | 294/90 |
| 3,715,269 | 2/1973 | Mehren | 176/36 R |
| 3,733,251 | 5/1973 | Gilbertson et al. | 294/86.15 X |
| 3,734,824 | 5/1973 | Ripley | 176/36 R |

*Primary Examiner*—Evon C. Blunk
*Assistant Examiner*—Johnny D. Cherry
*Attorney, Agent, or Firm*—Dean E. Carlson; Frederick A. Robertson; L. E. Carnahan

[57] ABSTRACT

A simple, reliable, and fast-acting means for releasing a control element and allowing it to be inserted rapidly into the core region of a nuclear reactor for scram purposes. A latch mechanism grips a coupling head on a nuclear control element to connect the control element to the control drive assembly. The latch mechanism is closed by tensioning a cable or rod with an actuator. The control element is released by de-energizing the actuator, providing fail-safe, rapid release of the control element to effect reactor shutdown. A sensing rod provides indication that the control element is properly positioned in the latch. Two embodiments are illustrated, one involving a collet-type latch mechanism, the other a pliers-type latch mechanism with the actuator located inside the reactor vessel.

5 Claims, 5 Drawing Figures

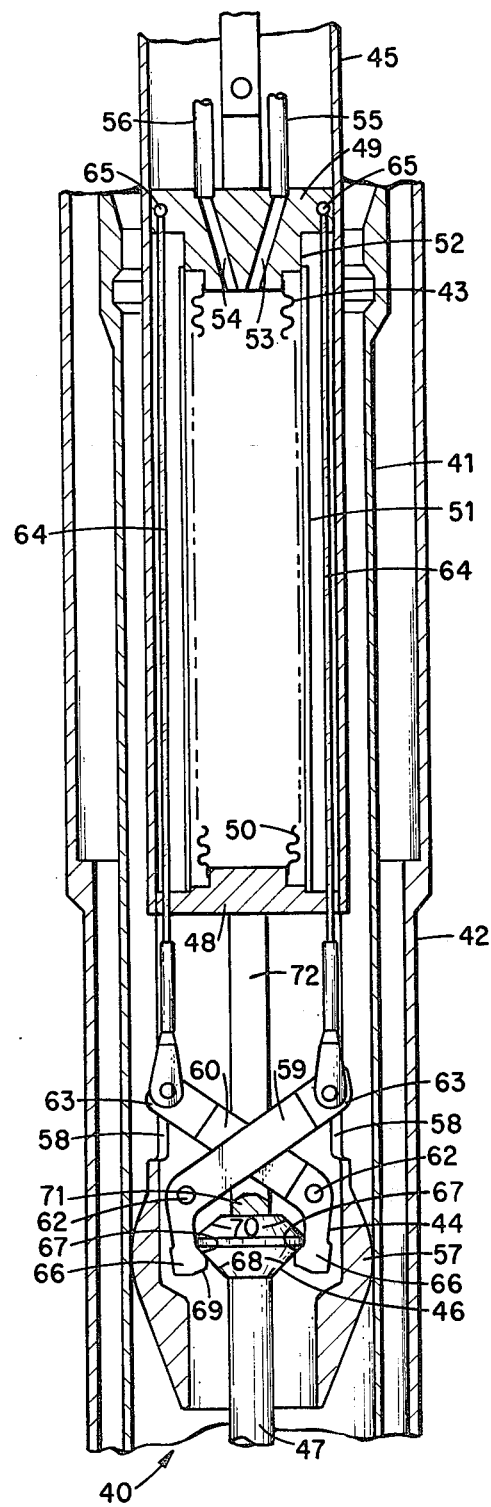

QUICK RELEASE LATCH FOR REACTOR SCRAM

BACKGROUND OF THE INVENTION

The invention described herein was made in the course of, or under, Contract No. AT(04-3)-893, Task 7, with the United States Atomic Energy Commission.

This invention relates to control rod drives for nuclear reactors, particularly to such drives for "scramming" the control rods should an emergency occur, and more particularly to a simple, reliable, fast-acting means for releasing a control element and allowing it to be inserted rapidly into the core region of a nuclear reactor for scram or fast shutdown purposes.

The use of control rods and associated drives to regulate the reactivity of a nuclear reactor by varying the location of the control rods with respect to the reactive core is well known. Various types of control rod drive systems utilizing releasable gripping or latch mechanisms have been developed, as exemplified by U.S. Pat. No. 3,139,384 issued June 30, 1964 and U.S. Pat. No. 3,604,746 issued Sept. 14, 1971. In general, such drives are capable, under normal conditions, of gradually inserting and withdrawing one or more associated control rods so as to regulate the power output of the reactor. With a view toward the possibility of an emergency condition arising, as by an unexpected rise in reactivity, such drives also generally include arrangements for "scramming" the control rods, i.e., for rapid full insertion of the control rods into the reactive core to quickly shutdown the reactor. U.S. Pat. No. 3,089,839 issued May 14, 1963, and U.S. Pat. No. 3,575,804 issued Apr. 20, 1971 exemplify prior art control rod scram systems.

With the advent of the liquid metal fast breeder reactors (LMFBR), a need for faster, less complex, more reliable control rod scram or shutdown systems has become apparent, whereby the reactivity of the reactor can be quickly controlled by rapid insertion of the control rods into the reactor core. Furthermore, the unique friction and wear characteristics of structural metals in a high temperature liquid sodium environment require that the mechanisms be designed to be insensitive to changes in friction coefficient and operate over the widest possible range of friction coefficients.

SUMMARY OF THE INVENTION

The present invention fulfills the above-mentioned need by providing a simple, reliable, and fast-acting means for releasing a control element and allowing it to be inserted rapidly into the core region of a nuclear reactor for scram purposes, and is particularly adapted for use in an LMFBR. This fast shutdown ability is accomplished by utilizing a quick release latch mechanism which is closed by tensioning a cable or rod with an actuator. The control element is released by de-energizing the actuator, providing fail-safe rapid release of the control element to effect reactor shutdown. One embodiment of the invention utilizes a short stroke collet-type latch with the actuator mounted in a mechanism housing above the reactor whereas another uses a pliers-type latch with the actuator located inside the reactor vessel.

Therefore, it is an object of this invention to provide a quick release latch mechanism for reactor scram application.

A further object of the invention is to provide a quick release latch mechanism activated through an actuator controlled tensioning cable or rod.

Another object of the invention is to provide a quick release latch mechanism for nuclear reactor control rods using a short stroke collet-type arrangement.

Another object of the invention is to provide a quick release latch mechanism for control rods of a nuclear reactor using a pliers-type latch arrangement.

Another object of the invention is to provide a quick release latch mechanism for control elements of a nuclear reactor having the actuator located within the reactor vessel.

Other objects of the invention will become readily apparent from the following description and accompanying drawings.

BRIEF DESCRIPTION OF THE DRAWINGS

FIG. 4 is a view, partially in cross-section, of another embodiment of the invention utilizing a pliers-type quick release latch illustrated in the locked position; and FIG. 5 is a partial side view of the FIG. 4 embodiment taken along the centerline of FIG. 4 as indicated by the arrows.

DESCRIPTION OF THE INVENTION

The invention, as pointed out above, involves latch mechanisms of the quick release type for reactor scram application, and is particularly adapted for use in a liquid metal fast breeder reactor (LMFBR) in that it provides a simple, reliable, and fast-acting means of releasing a control element and allowing it to be inserted rapidly into the core region of the reactor to effect shutdown thereof. Two embodiments of the invention are illustrated and described, each having a latch mechanism which is closed by tensioning a cable or rod by an actuator, and released by de-energizing the actuator, wherein a control element can be provided a fail-safe means of release for insertion into the reactor core by gravity and/or other forces, such as hydraulic or pneumatic. The first embodiment, illustrated in FIGS. 1-3, utilizes a short stroke collet-type quick release latch. The second embodiment, illustrated in FIGS. 4 and 5, uses a pliers-type quick release latch, with the actuator therefor located inside the reactor vessel.

Figure 1:
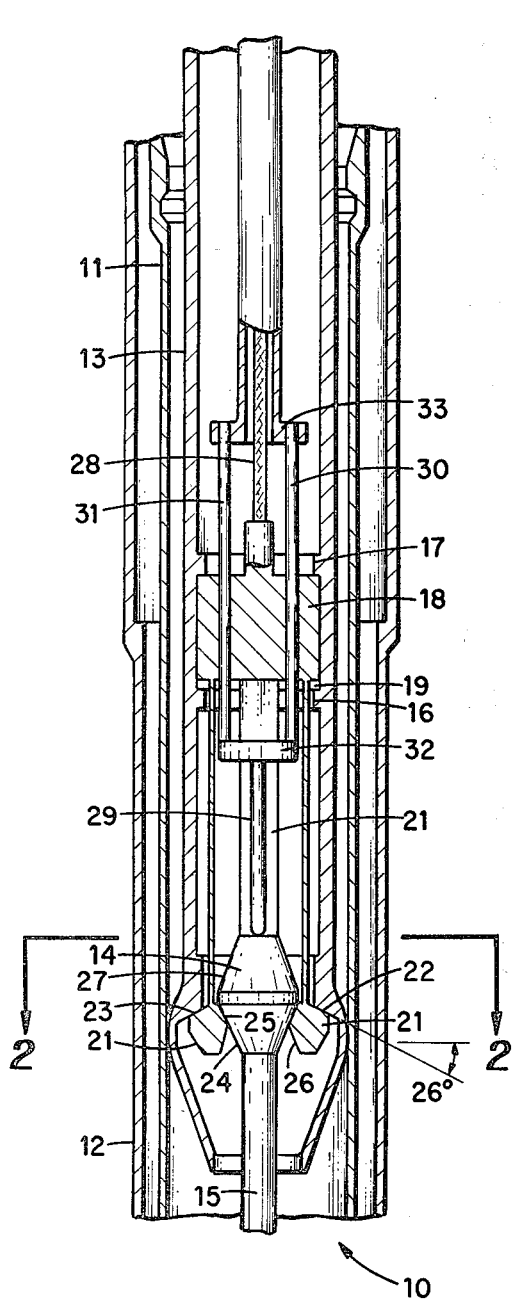
FIG. 1 is a view, partially in cross-section, of an embodiment of the invention utilizing a collet-type quick release latch illustrated in the locked position.
Figure 2:
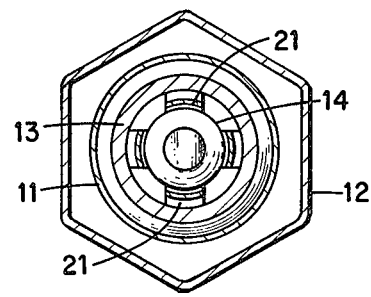
FIG. 2 is a cross-sectional view taken along lines A—A of FIG. 1.
Figure 3:
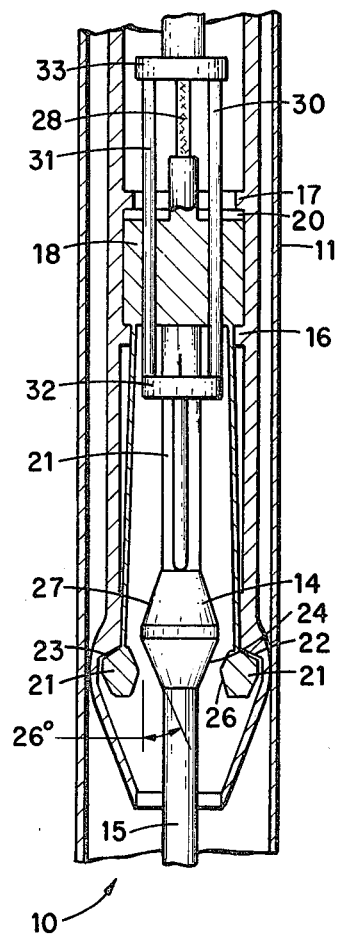
FIG. 3 is a partial view of the FIG. 1 embodiment illustrated in unlocked position.

Referring now to the embodiment illustrated in FIGS. 1-3, the latch mechanism generally indicated at 10 is located within a round guide tube 11 of a hexagonal shaped channel 12 which, as known in the art, contains a control rod for insertion into a reactor core, drive system for the control rod being normally located externally of the reactor vessel containing the core. Latch mechanism 10 comprises a hollow drive shaft or member 13 having a diverging-converging lower end portion, which receives support from, with minimum friction along, guide tube 11 and within which is retained a coupling head 14 of a control rod 15 which is positioned so as to be inserted into a reactor core, not shown. Drive shaft 13 is provided with a pair of spaced radially inwardly protruding sections 16 and 17 between which a force translating block or member 18 is movably mounted such that block 18 can be moved axially through the spaces indicated at 19 or 20 located between block 18 and protruding sections 16 and 17, respectively. Attached to force translating block 18 is a gripper assembly comprising a plurality of collet members or grippers 21 (four illustrated in this embodiment). Collet grippers 21 are configured to cooperate with the diverging section of drift shaft 13 which defines a cam surface 22 positioned at an optimum angle (26° in this embodiment) with respect to horizontal. As indicated at 23, each of collet grippers 21 is provided with a surface which cooperates with cam surface 22. Coupling head 14, as shown in FIG. 1, is configured to define along the lower half thereof a surface 24 at an optimum angle (26° in this embodiment) with respect to vertical, with collet grippers 21 each having a cooperating surface 25. In collet grippers 21 each contain a tapered surface 26 adapted to cooperate with a tapered surface 27 along the upper half of coupling head 14, for reasons described hereinafter. Force translating block 18 is secured to a tension member such as cable or rod 28 which is connected to an actuator (not shown) of the pneumatic, hydraulic, or mechanical type, which may be positioned within or external of the reactor vessel (not shown) containing the core. A sensor mechanism, for purposes described below, is mounted within drive shaft 13 and connected to indicate, through appropriate instrumentation located at higher elevations in the control rod drive system, that the coupling head 14 is properly registered in the latch mechanism 10. The sensor mechanism includes a sensing rod 29 secured through a force transmitting assembly composed of a pair of rods 30 and 31 which pass through apertures in force transmitting block 18 and secured at opposite ends to members 32 and 33, member 32 being attached to sensing rod 29 while member 33 is hollow providing for passage of tension member (cable or rod 28) therethrough.

FIG. 1 illustrates the latch mechanism 10 in the locked position accomplished by tension member 28 being placed under tension via an actuator, not shown, which moves force transmitting block 18 upwardly to abuttment with protruding member 17 on drive shaft or member 13 and defining the space 19 between protruding member 16 and block 18, which action in turn moves collet grippers 21 upwardly into contact with cam surface 22 of drive shaft 13 constraining grippers 21 inwardly causing surfaces 25 thereof to contact surface 24 of coupling head 14 retaining the coupling head therein, as shown.

To release coupling head 14 from latch mechanism 10 and allow the control element or rod 15 to descend into the core region under the action of a constantly available force (e.g., gravity and/or other forces, such as hydraulic or pneumatic), the tension in the member 28 is released. Upon release of the tension in the cable or rod, the grippers 21 are allowed to move downwardly and outwardly along surface 22, and the coupling head is allowed to move downwardly, as shown in dotted lines in FIG. 2, thereby separating the control rod 15 from the latch mechanism 10, allowing the control rod to move downwardly into the in-core position for shutting down the reactor. Upon release of the tension in member 28, the force transmitting block moves only through the small distance of space 19, thus providing an extremely short actuation stroke to release the coupling head 14 from collet grippers 21.

The pairs of mating surfaces (coupling head to gripper and gripper to back-up cam) are carefully designed with proper engagement angles to allow latch operation over a wide range of friction coefficients. In the embodiment represented in FIGS. 1, 2, and 3, friction coefficients as high as 2.05 can be easily accommodated. Thus, a quick and fail-safe release is coupled with a short stroke actuation and an insensitivity to change in the friction coefficient.

The extremely short actuation stroke (movement through space 19), which in this embodiment is 0.25 inch, is desirable because distortions of the drive shaft and mechanism do not impair the ability to achieve scram. It is intended that the latch mechanism 10 be located well below the closure of the reactor vessel and in fact may be located within the control channel. Consequently, the control element could be as short as possible and would have to travel the least possible distance. Distortions of the drive mechanism and relative motion between the core and closure, both of which could be caused by a seismic disturbance, have negligible effects and do not prevent release of the control element or rod for scram.

The need for accommodation of a wide range of friction coefficients arises because of the uncertainties associated with the prevailing friction coefficient under all operating conditions in the reactor. Depending upon the available actuating force, the embodiment illustrated in FIGS. 1–3 is capable of operating properly with friction coefficients of from near zero to on the order of 5.0. This advantage is achieved through correct design of the contact surfaces (cam surface 22 and gripper surface 23) and between the surfaces 25 of grippers 21 and the surface 24 of coupling head 14.

To retrieve the element or rod 15 from the in-core position, drive shaft 13 is lowered until sensing rod 29 indicates that coupling head 14 is properly registered in latch mechanism 10. The tension force is then reapplied to tension cable or rod 28 by the actuator, and collet grippers are moved upwardly into engagement with cam surface 22 thereby securing coupling head 14 therein, whereupon drive shaft 13 is raised pulling control rod 15 from the reactor core to the position as shown in FIG. 1. This recoupling or retrieving action of latch mechanism 10 could be accomplished in other ways without affecting the quick release characterstics.

Referring now to the embodiment illustrated in FIGS. 4 and 5, the latch mechanism generally indicated at 40 is located within a round guide tube 41 inside a hexagonally shaped control channel 42, as described above with respect to the embodiment of FIGS. 1–3. Latch mechanism 40 is of a bellows actuated pliers-type gripper assembly generally indicated at 43 and 44, respectively, mounted within a hollow drive shaft or member 45, with gripper assembly 44 positioned to releasably retain a coupling head 46 of a control rod 47. Bellows assembly 43 is composed of a lower member or end cap 48 fixedly secured to drive shaft 45, an upper member or end cap 49 slidably positioned within drive shaft 45, a flexible member 50 connected at opposite ends to end caps 48 and 49, and a shield or sleeve 51 positioned around flexible member 50 and connected at the lower end thereof to end cap 48 and mounted in sliding relation with a reduced diameter surface area 52 of upper end cap 49 to allow for upward expansion of flexible member 50 while providing protection thereof. Upper end cap 49 is provided with a pair of fluid passageways 53 and 54 extending therethrough and providing fluid communication between the interior of flexible member 50 and a fluid pressure control system, not shown, via pressurizing lines 55 and 56. Drive shaft or member 45 is provided at the lower end with a diverging-converging section 57 which is in light frictional abuttment with the inner surface of guide tube 41 and functions as a centering means for latching mechanism 40 as it moves within the guide tube. A pair of oppositely spaced openings or apertures 58 are positioned in drive shaft 45 directly above diverging-converging section 57 which allows for movement of pliers-type gripper assembly 44. Gripper assembly 44 comprises a pair of tong-like members 59 and 60 pivotably mounted to a support member 61 via pins 62, and connected at one end 63 thereof to a pair of tension members such as cables or rods 64 which pass upwardly through apertures in lower end cap 48 of bellows assembly 43 and are secured in upper end cap 49 at 65. Upward movement of bellows end cap 49 tensions cables or rods 64 causing tong-like members 59 and 60 to pivot on pins 62 whereby opposite ends 66 of tong-like members 59 and 60 move inwardly to retain coupling head 46 therein. Ends 63 of tong-like members 59 and 60 and the lower ends of tension cables 64 are caused to move within openings 58 of drive shaft 45 by the action of fluid entering the bellows assembly 43 via either or both of passageways 53 and 54 whereby cables 64 are placed under tension by upward movement of bellows end cap 49 causing pliers-type gripper assembly 44 to retain coupling head 46 of control rod 47 in the raised or out-of-core position, as shown in FIGS. 4 and 5.

Should a condition arise such that scram or immediate shutdown of the reactor were required, the fluid under pressure in flexible member would be released through one or both of passageways 53 and 54 by mechanism not shown, thereby relieving the tension on cable 64 and corresponding holding force on plier-like assembly 44. Downward gravity and/or hydraulic forces on the control rod or element 47 causes the engagement surface 68 of the coupling head to spread the mating surfaces of the released plier-like gripper assembly and allow the control rod to drop into the core region to scram the reactor.

To retrieve the control element 47 from the core, as shown in FIG. 4, ends 66 of tong-like members 59 and 60 are configured to define a surface 67 which cooperates with a surface 68 on the lower half of coupling head 46, which in this embodiment is about 60° with respect to the vertical axis. Ends 66 are also provided with a tapered surface 69 which cooperates with surface 70 on the upper half of coupling head 46 to accommodate reengagement of the latch and coupling head and hence easier retrieval of control rod 15 after it has been released from latch mechanism 40. A sensing mechanism is located in drive shaft 45 and includes a sensing rod or pad 71 connected through upwardly extending members 72 which pass through apertures in bellows end caps 48 and 49 to appropriate instrumentation, not shown. Support members 61 for tong-like members 59 and 60 are mounted above and secured to the upper surface of sensing rod or pad 71.

To retrieve the control element after release, the drive shaft or member 45 is lowered until the sensing rod or pad 71 indicates that the coupling head 46 is properly registered in latch mechanism 40. The tension force on cables 64 is then reapplied by pressurizing the bellows assembly 43 and the pliers-like gripper assembly 44 secures the coupling head 46 therein. Again, the quick release feature of the bellows actuated pliers-like gripper assembly can be utilized separately from the described sensing mechanism.

As in the embodiment of FIGS. 1–3, the FIGS. 4 and 5 latch mechanism provides a compact, reliable and fast-acting means of retaining and releasing a control element for rapid insertion into the core region of a nuclear reactor for scram purposes. This embodiment has the significant advantage that no parts of the release mechanism other than small diameter pressure tubing must pass through the reactor top closure, and thus the probability of failure to release in the event of a seismic disturbance is minimized.

The bellows assembly is capable of providing a relatively high holding force, and the latch linkage will function over a wide range of friction coefficients (desirable for liquid sodium cooled service because of the uncertainties mentioned earlier).

The latch mechanism embodied in FIGS. 4 and 5 will function properly with friction coefficients up to 3.6 if the coupling head/gripper contact angle is 60°. For this geometry, the tension in each of the two cables ranges from 350 lb to zero for friction coefficients ranging from 0.2 to 3.6, respectively.

It has thus been shown that the present invention provides a quick release latch for reactor scram application which is simple, reliable, and fast-acting, thereby providing added safety to the operation of nuclear reactors, particularly an LMFBR.

While particular embodiments of the invention have been illustrated and described, modifications will become apparent to those skilled in the art, and it is intended to cover in the appended claims all such modifications as come within the spirit and scope of the invention.

What we claim is:

1. A quick release mechanism for allowing rapid insertion of a control element into the core of a nuclear reactor for scram purposes comprising: a hollow drive member having a diverging-converging end section, a gripper assembly movably positioned within said hollow drive member and adapted to cooperate with a coupling head of an associated control element, and means including tensioning means for moving said gripper assembly such that tensioning said tensioning means causes said gripper assembly to retain an associated control element coupling head therein and release of tension on said tensioning means allows such a retained associated control element to be released therefrom for rapid insertion into an associated reactor core, said hollow drive member being provided with a pair of axially spaced inwardly protruding portions, said diverging-converging section of said hollow drive member including a cam surface of a prescribed angle, said gripper assembly comprising a plurality of collet grippers, each of said collet grippers having an outer surface at one end thereof configured to cooperate with said cam surface, each of said collet grippers being connected at an end opposite said one end to a force transmitting member, said force transmitting member being located intermediate and movable between said inwardly protruding portions of said hollow drive member, said tensioning means being connected to said force transmitting member, and said collet grippers each having an inner surface at said one end configured to cooperate with an adjacent surface on a retained control element coupling head, whereby tensioning of said tensioning means moves said force transmitting member from contact with a lower of said pair of inwardly protruding portions of said hollow drive member into contact with an upper of said protruding portions causing movement of said collet grippers toward said lower one of said protruding portions and into contact with said cam surface such that said collet grippers contact and retain therebetween an associated control element coupling head.

2. The quick release mechanism defined in claim 1, in combination with a sensing means including a sensing rod for sensing the location of said plurality of collet grippers with respect to an associated control element coupling head to assure that such is properly positioned to be retained between said collet grippers upon tensioning of said cable means.

3. The quick release mechanism defined in claim 1, wherein said cam surface is at an angle of about 26° with respect to horizontal, thereby allowing the cam to function properly with friction coefficients as high as 2.05.

4. The quick release mechanism defined in claim 1, wherein said one end of each of said plurality of collet grippers comprises an enlarged cross-sectional area and configurated such that said outer surface thereof is located on an upper portion thereof at an angle of about 26° with respect to horizontal, and that said inner surface thereof is located on an upper portion thereof at an angle of about 26° with respect to vertical, thereby allowing the grippers to function properly with friction coefficients as high as 2.05.

5. The quick release mechanism defined in claim 1, in combination with means for sensing the location of an associated control element to be retained with respect to said gripper assembly.

* * * * *